April 23, 1968  R. C. KLING  3,379,484

PIVOTED RACK FOR UTENSILS AND THE LIKE

Filed Aug. 5, 1966

INVENTOR
RALPH C. KLING

BY  Gerald P. Welch
ATTORNEY

United States Patent Office 3,379,484
Patented Apr. 23, 1968

3,379,484
PIVOTED RACK FOR UTENSILS AND THE LIKE
Ralph C. Kling, 4220 N. 42nd St.,
Milwaukee, Wis. 53216
Filed Aug. 5, 1966, Ser. No. 570,505
2 Claims. (Cl. 312—300)

ABSTRACT OF THE DISCLOSURE

A pivoted rack for a cupboard including a vertical plate member pivoted on a vertical axis just within the front of an end wall of the cupboard and adapted to swing back inwardly against said end wall, and a plurality of pivoted vertical plate members spaced thereon and apertured to accommodate hanger hooks for utensils.

The invention herein relates to improvements in racks and more particularly to an improved pivoted composite rack for kitchen utensils and the like.

An object of the invention is to provide a pivoted rack which will utilize a maximum of space in a cupboard in which the rack is contained.

Another object of the invention is to provide a primary plate element hinged on a vertical axis within and adjacent to a cupboard door, and a plurality of secondary vertical plate elements pivoted thereto and spaced thereon apertured to hold hook means for suspending kitchen utensils or the like thereon.

Other and further objects of the invention will be apparent as the description proceeds, reference being had to the accompanying drawing, in which.

Figure 1:
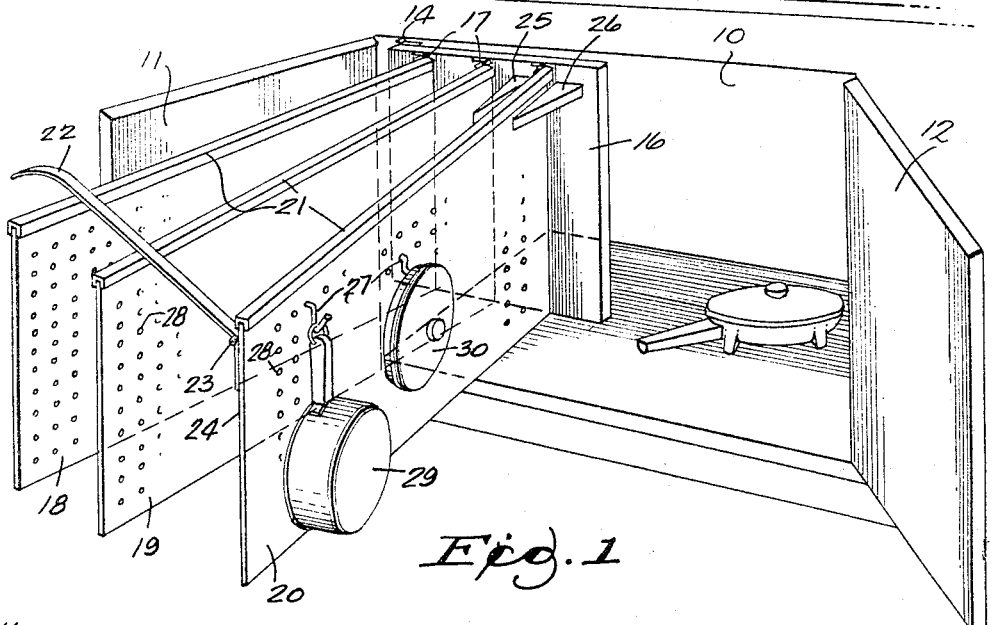
FIG. 1 is a view in perspective from above of a pivoted rack for utensils or the like embodying the invention.
Figure 2:
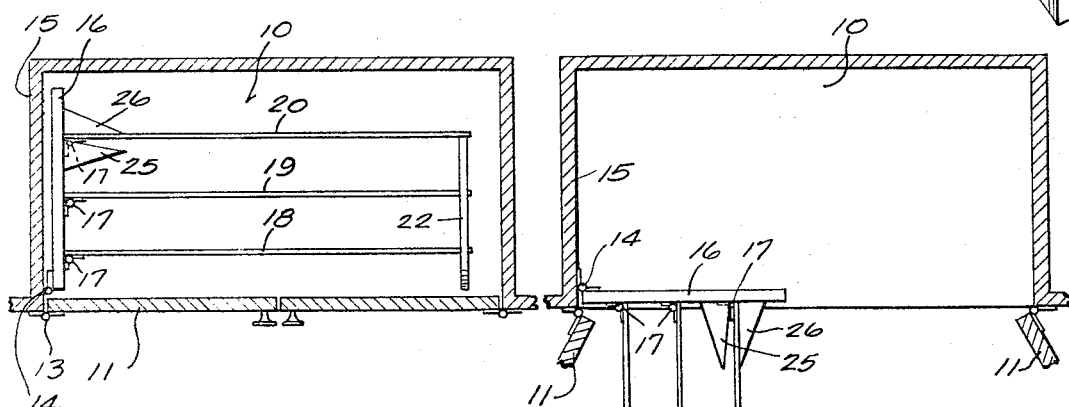
FIG. 2 is a plan view partly in elevation and partly in section.
Figure 3:
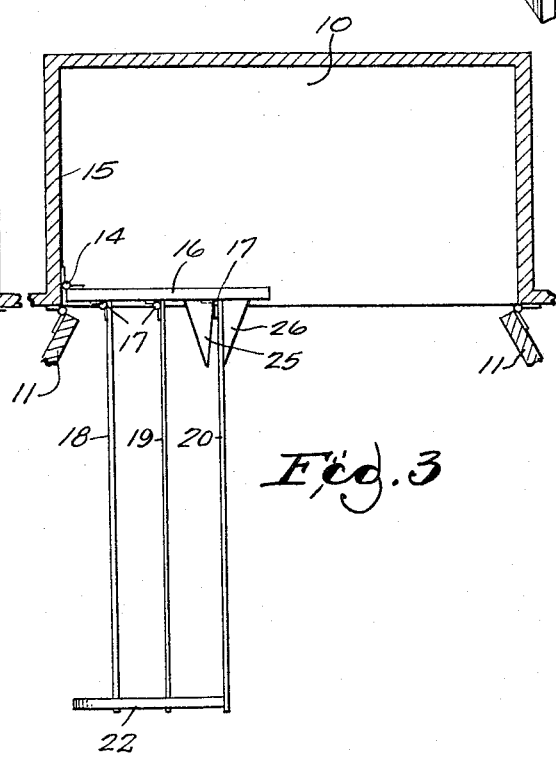
FIG. 3 is a similar view with the composite rack in opened position.

Referring more particularly to the drawing, the numeral 10 refers to a double width kitchen cabinet having conventional doors 11 and 12. At a point just inside the hinge 13 of door 11, a vertically disposed piano hinge 14 is secured to end wall 15 of the cabinet 10. The free segment of said piano hinge 14 carries a rectangular swingable plate element 16. Spaced on one face of the plate element 16 are a plurality of vertically disposed hinges 17, each having attached thereto one of three rectangular apertured boards 18, 19 and 20. A reinforcement channel 21 embraces the upper edge of each apertured board 18, 19 and 20.

A handle member 22 is secured by hinge 23 adjacent the upper edge at the outer end 24 of the board 20, and the lateral hinge movement of the latter is limited by the triangular guide elements 25 and 26 fixed to the plate element 16. A plurality of peg hooks 27 are engaged in apertures 28 of the boards 18, 19 and 20 to accommodate various utensils such as the items 29 and 30.

In use, the handle member 22 may be used to manually move the rack in or out of the cabinet as desired in storing or retrieving the utensils.

It will be understood that the device is capable of many modifications in structure and design, without departing from the spirit of the invention, within the scope of the appended claims.

Having thus described the invention, what is claimed and desired to be secured by Letters Patent of the United States, is:

1. In a cupboard or the like, a vertical plate element hinged frontally of one end wall within said cupboard, and a plurality of vertically disposed boards hinged to said plate element and spaced thereon, and apertures in said vertical boards for suspending utensils or the like.

2. An assembly as in claim 1, and handle means hinged adjacent the top of the vertical board fastened adjacent the free end of said vertical plate element, and dual guide means attached to said plate element adjacent the top thereof adjoining said vertical board to limit the hinge movement in either direction of the latter to facilitate movement of the assembly in and out of the cupboard.

References Cited

UNITED STATES PATENTS

| 622,195 | 4/1899 | Allison | 312—300 X |
| 757,003 | 4/1904 | Wilcox | 312—300 X |
| 1,938,370 | 12/1933 | Bodkin. | |
| 3,275,272 | 9/1966 | Kirk. | |

JAMES T. McCALL, Primary Examiner.